United States Patent
Li

(10) Patent No.: US 6,349,091 B1
(45) Date of Patent: Feb. 19, 2002

(54) METHOD AND APPARATUS FOR CONTROLLING COMMUNICATION LINKS BETWEEN NETWORK NODES TO REDUCE COMMUNICATION PROTOCOL OVERHEAD TRAFFIC

(75) Inventor: Chris Cho-Pin Li, New York, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/706,845

(22) Filed: Nov. 7, 2000

Related U.S. Application Data

(60) Provisional application No. 60/164,941, filed on Nov. 12, 1999.

(51) Int. Cl.[7] .................................................. H04Q 7/24
(52) U.S. Cl. ..................... 370/238; 370/338; 370/340; 370/410
(58) Field of Search ................................. 370/230, 231, 370/232, 235, 236, 237, 238, 352, 389, 395, 400, 252, 351, 328, 340, 338, 410

(56) References Cited

U.S. PATENT DOCUMENTS

| | | |
|---|---|---|
| 4,958,343 A | 9/1990 | Abramovici et al. |
| 5,068,916 A | 11/1991 | Harrison et al. |

(List continued on next page.)

FOREIGN PATENT DOCUMENTS

| | | |
|---|---|---|
| DE | 41069741 A1 | 9/1992 |
| JP | 06121373 | 4/1994 |

(List continued on next page.)

OTHER PUBLICATIONS

Lin, C.R. et al, "Real–time support in multihop wireless networks", Wireless Networks 5 (1999), pp. 125–135.

(List continued on next page.)

*Primary Examiner*—Ricky Ngo

(57) ABSTRACT

Link-State Advertisement (LSA) and other routing control packets are transmitted within a wireless communication system or network via selective enablement of control links for transference of the packets between network nodes. Specifically, an exemplary wireless network includes a plurality of nodes arranged into clusters with each cluster having cluster member nodes and a designated cluster head node. The nodes communicate with each other via an intranet protocol, while the network may communicate with other external networks in accordance with an internetworking protocol. A database within each network head node contains link information for that node. The LSA packets contain information to update the head node databases, while other routing control packets generally contain various routing information for network nodes to facilitate message transmissions. The routing control packets are transmitted to each head node to control routing functions and enable each database to maintain current information. In order to reduce overhead traffic due to transmission of numerous LSA and other routing control packets, the present invention selectively controls enablement of control links (e.g., links that transport routing control information) to transmit the LSA and other routing control packets to head nodes within the network. In other words, the present invention selectively reduces the quantity of control links between head nodes to transmit the LSA and other routing control packets with reduced protocol overhead traffic, thereby permitting the network to utilize link-state based protocols effectively (e.g., with minimal impact on network throughput) while expanding to larger scales.

46 Claims, 6 Drawing Sheets

U.S. PATENT DOCUMENTS

| | | | |
|---|---|---|---|
| 5,231,634 A | | 7/1993 | Giles et al. |
| 5,233,604 A | * | 8/1993 | Ahmadi et al. ............. 370/238 |
| 5,241,542 A | | 8/1993 | Natarajan et al. |
| 5,317,566 A | * | 5/1994 | Joshi ........................ 370/238 |
| 5,530,912 A | | 6/1996 | Agrawal et al. |
| 5,535,195 A | | 7/1996 | Lee |
| 5,631,897 A | | 5/1997 | Pacheco et al. |
| 5,684,794 A | | 11/1997 | Lopez et al. |
| 5,687,168 A | | 11/1997 | Iwata |
| 5,805,593 A | * | 9/1998 | Busche ....................... 370/396 |
| 5,805,977 A | | 9/1998 | Hill et al. |
| 5,805,995 A | | 9/1998 | Jiang et al. |
| 5,825,772 A | | 10/1998 | Dobbins et al. |
| 5,881,095 A | | 3/1999 | Cadd |
| 5,896,561 A | | 4/1999 | Schrader et al. |
| 5,903,559 A | | 5/1999 | Acharya et al. |
| 5,909,651 A | | 6/1999 | Chander et al. |
| 6,052,594 A | | 4/2000 | Chuang et al. |
| 6,130,881 A | * | 10/2000 | Stiller et al. ................ 370/238 |
| 6,192,053 B1 | | 2/2001 | Angelico et al. |
| 6,208,870 B1 | | 3/2001 | Lorello et al. |
| 6,246,875 B1 | | 6/2001 | Seazholtz et al. |

FOREIGN PATENT DOCUMENTS

| | | |
|---|---|---|
| JP | 08125654 | 5/1996 |
| JP | 09200850 | 7/1997 |
| JP | 09205668 | 8/1997 |
| JP | 11032373 | 2/1999 |
| WO | WO09718637 | 5/1997 |

OTHER PUBLICATIONS

Koubias, S.A. et al, "Further results on the performance . . . ATP–2 for local area networks", IEEE Transactions on Computers, vol. V37, No. 3, 1988, pp. 376–383.

Bandai, M. et al., "Performance analysis of a channel reservation . . . unicast and multicast packets", Trans. Inst. Electron. Inf. Comm. Eng. B–I, Japan, vol. J82B–1, No. 2, Feb. 1999, pp. 236–250.

Riera, M.O.I. et al, "Variable channel reservation . . . mobility platforms", VTC '98, 48$^{th}$ IEEE Vehicular Technology Conference, 1998, pp. 1259–1263.

Kee, Chaing Chua et al, "Probabilistic channel reservation . . . pico/microcellular networks", IEEE Commun. Lett. (USA), vol. 2, No. 7, Jul. 1998, pp. 195–196.

Tripathi, S.B. et al., "Performance analysis of microcellisation . . . cellular wireless networks", 1997 IEEE Inter. Conf. On Personal Wireless Communications, pp. 9–14.

Boumerdassi, S., "A new channel reservation . . . cellular communication systems", Broadband Communications, Fourth Intern. Conf. On Broadband Commun., 1998, pp. 157–168.

Wei, Huang et al, "Channel reservation for high rate service in cellular networks", 1997 IEEE Pacific Rim Conference, vol. 1, pp. 350–353.

Konishi, S. et al, "Flexible transmission bandwidth . . . for NGSO MSS networks", IEEE J. Sel. Areas Commun. (USA), vol. 15, No. 7, Sep. 1997, pp. 1197–1207.

Ohta, C., et al, "Effects of moving mobiles . . . micro–cellular systems", IEEE Globecom 1996, vol. 1, 1996, pp. 535–539.

Kanazawa, A. et al, "Performance study of . . . micro–cellular systems", IEICE Trans. Fundam. Electron. Commun. Comput. Sci. (Japan), vol. E79–A, No. 7, Jul. 1996, p. 990–996.

Harms, J.J. et al, "Performance modeling of a channel reservation service", Comput. Netw. ISDN Syst. (Netherlands), vol. 27, No. 11, Oct. 1995, pp. 1487–1497.

Harms, J.J. et al, "Performance of scheduling algorithms for channel reservation", IEE Proc., Comput. Digit. Tech. (UK), vol. 141, No. 6, Nov. 1994, pp. 341–346.

Barghi, H. et al, "Time constrained performance . . . for local networks", Eleventh Annual International Phoenix Conference on Computers and Communications, 1992, pp. 644–650.

Masuda, E., "Traffic evaluation of . . . on a T–S–T network", Electron. Commun. Jpn. 1, Commun. (USA), vol. 72, No. 8, Aug. 1989, pp. 104–119.

"PacTel Withdraws . . . dialtone operations", Multichannel News Jan. 29,, 1996, pp. 48.

Iwata et al., "Scalable Routing . . . Wireless Networks", IEEE Journal on Selected Areas in Communications, vol. 17, No. 8, Aug. 1999, pp. 1369–1379.

Joa–Ng, et al, "A Peer–to–Peer . . . Mobile Ad Hoc Networks", IEE Journal on Selected Areas in Communications, vol. 17, No. 8, Aug. 1999, pp. 1415–1425.

Das et al, "Routing in ad hoc networks using a spine", Proceedings of 6$^{th}$ Intern. Conf. On Computer Commun. And Networks, Las Vegas, 1997, pp. 34–39.

Krishna et al, "A cluster–based approach for routing in ad–hoc networks", Proceedings of the Second USENIX Symposium on Mobile and Location—Independent Computing, 1995, pp. 1–10.

Baker D.J. et al, "The architectural organization of a mobile radio network via a distributed algorithm", IEEE Trans. Commun., vol. Com–29, No. 11, pp. 1694–1701, Nov. 1981.

Baker, D.J. et al, "A distributed algorithm . . . mobile radio network", in Proc. IEEE ICC'82, pp. 2F.6.1–2F.6.5.

Ephremides, A. et al, "A design Concept . . . hopping signaling", Proc. IEEE, vol. 75, No. 1, Jan. 1987, pp. 56–73.

Gerla M. et al, "Multicluster, mobile, multimedia radio network", Baltzer Journals, Jul. 12, 1995, pp. 1–25.

Lin, C.R. et al, "Adaptive clustering for mobile wireless network", IEEE JSAC, Sep. 1997, pp. 1–21.

MingLiang et al, "Cluster Based Routing Protocol (CBRP) Functional Specification" Internet–Draft, Aug. 14, 1998.

Moy, J., "OSPF version 2", RFC2328, Apr. 1998.

Kweon, Seok–Kyo, Real–Time . . . Packet Networks (Quality of Service, ATM, Ethernet), 1998, pp. 1–158.

Huang, Yih, Group Communication Under Link–State Routing (Multipoint Communications, Leader Election), 1998, pp. 1–204.

Behrens, Jochen, Distributed Routing For Very Large Networks Based on Link Vectors (Routing Algorithm), 1997, pp. 1–109.

Khosravi–Sichani, et al, Performance Modeling and Analysis of the Survivable Signaling Network, Proceedings—IEEE Military Communications Conference, v 3, 1991, pp. 880–884.

Bellur, et al, "A Reliable, Efficient Topology . . . Dynamic Networks", IEEE INFOCOM '99, Conf. On Computer Commun. Proceed. 18$^{th}$ Annual Joint Conf. OfIEEE Comp. And Commun. Societies, vol. 1, 1999, pp. 178–186.

Ching–Chuan, et al, "On–Demand Multicast in Mobile Wireless Networks", Proceed. 6$^{th}$ Intern. Conf. On Network Protocols, 1998, pp. 262–270.

Garcia–Luna–Aceves, et al, "Scalable Link–State Internet Routing", Proceed. 6$^{th}$ Intern. Conf. On Network Protocols, 1998, pp. 52–61.

Huang et al, "Optimal Switch–Aided Flooding Operations in ATM Networks", 1998 IEEE ATM Workshop Proceedings, 1998, pp. 329–338.

Behrens, et al, Fast Disseminationof Link . . . Updates or Age Fields, Proceed. 17$^{th}$ Intern. Conf. On Distributed Computing Systems, 1997, pp. 51–58.

Garcia–Luna–Aceves, et al, "Distributed, Scalable Routing . . . States", IEEE J. Sel. Areas Commun. (USA), vol. 13, No. 8, Oct. 1995, pp. 1383–1395.

Behrens, et al, "Distributed, Scalable Routing Based on Link–State Vectors", Comput. Commun. Rev. (USA), vol. 24, No. 4, Oct. 1994, pp. 136–147.

Rutenburg et al, "How to Extract Maximum . . . Topology Updates", IEEE INFOCOM '93, Conf. On Comp. Commun. Proceed. 12$^{th}$ Annual Joint Conf. Of the IEEE Comp. And Commun. Societies, 1993, pp. 1004–1013.

Garcia–Luna–Aceves, "Reliable Broadcast of Routing Information Using Diffusing Computations", GLOBECOM '92, Communication for Global Users, IEEE Global Tel. Conf., 1992, pp. 615–621.

Moy, J., "OSPF Version 2", RFC 1583, Mar./1994.

Johnson et al, "Dynamic Source Routing in Ad Hoc Wireless Networks", Mobile Computing, 1996.

Broch et al, "The Dynamic Source Routing Protocol for Mobile Ad Hock Networks", IETF internet draft, Mar. 13, 1998.

Broch et al, "The Dynamic Source Routing Protocol for Mobile Ad Hock Networks", IETF internet draft, Oct. 22, 1999.

Johnson et al, "The Dynamic Source Routing Protocol for Mobile Ad Hock Networks", IETF internet draft, Nov. 17, 2000.

Park et al, "Temporally–Ordered Routing Algorithm (TORA) version 1", IETF internet draft, Aug. 7, 1998.

Park et al, "Temporally–Ordered Routing Algorithm (TORA) version 1", IETF internet draft, Oct. 22, 1999.

Park et al, "Temporally–Ordered Routing Algorithm (TORA) version 1", IETF internet draft, Nov. 24, 2000.

Perkins, "Ad Hoc On Demand Distance Vector (AODV) Routing", IETF Internet draft, Nov. 20, 1997.

Perkins, "Ad Hoc On Demand Distance Vector (AODV) Routing", IETF Internet draft, Nov. 24, 2000.

Deering et al, "Protocol Independent Multicast Version2, Dense Mode Specification", IETF internet draft, May 21, 1997.

Garcia–Luna_Aceves, "Source Tree Adaptive Routing (STAR) Protocol", IEFT Draft, Oct. 1999.

Wu et al, "Ad Hoc Multicast Routing Protocol Utilizing Increasing id–numbers (AMRIS)", IETF internet draft, 1998.

Ballardie, "Core Based Tree Multicast Routing", RFC 2186, Sep. 1997.

Ballardie et al, "Core Based Tree (CBT)", SIGCOMM '93, 1993, pp. 86–94.

Chiang et al, "Shared Tree Wireless Network Multicast", IC3N'97, Apr. 1997, pp. 1–16.

Chiang et al, "Forwarding Group Multicast Protocol (FGMP) for Multihop", Mobile Wireless Networks, ACM–Baltzer Journal of Cluster Computing, 1998.

Lee et al, "On–Demand Multicast Routing Protocol (ODMRP) for Ad Hoc Networks", IETF internet draft, Jan. 2000.

North et al, "Wireless Networked Radios: Comparison of Military, Commercial and R&D Protocols", Second Annual UCSD Conference on Wireless Communications, Mar. 3, 1999, pp. 1–6.

* cited by examiner

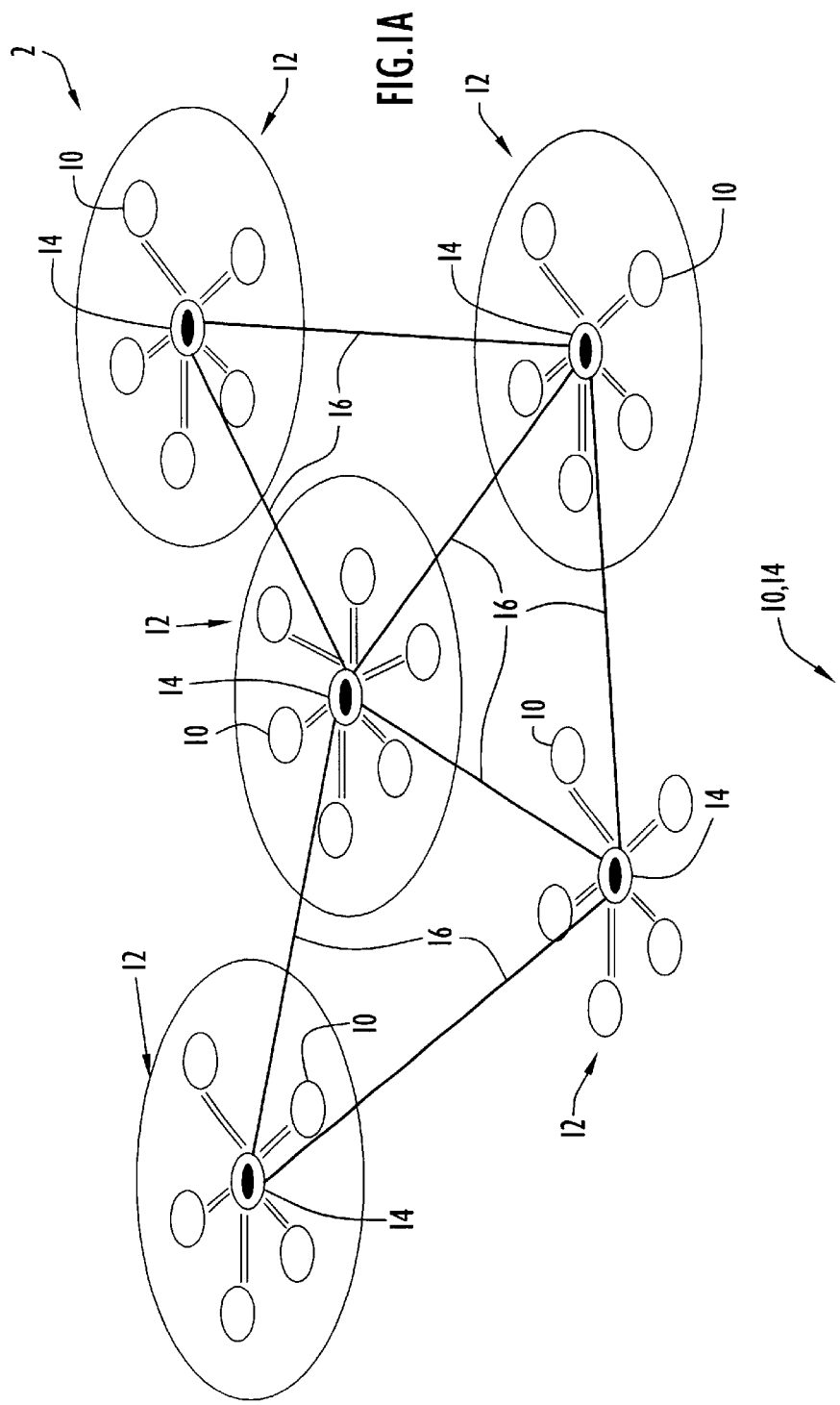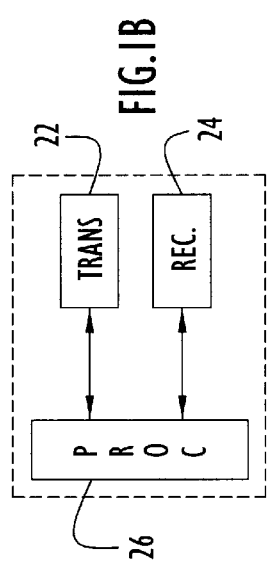

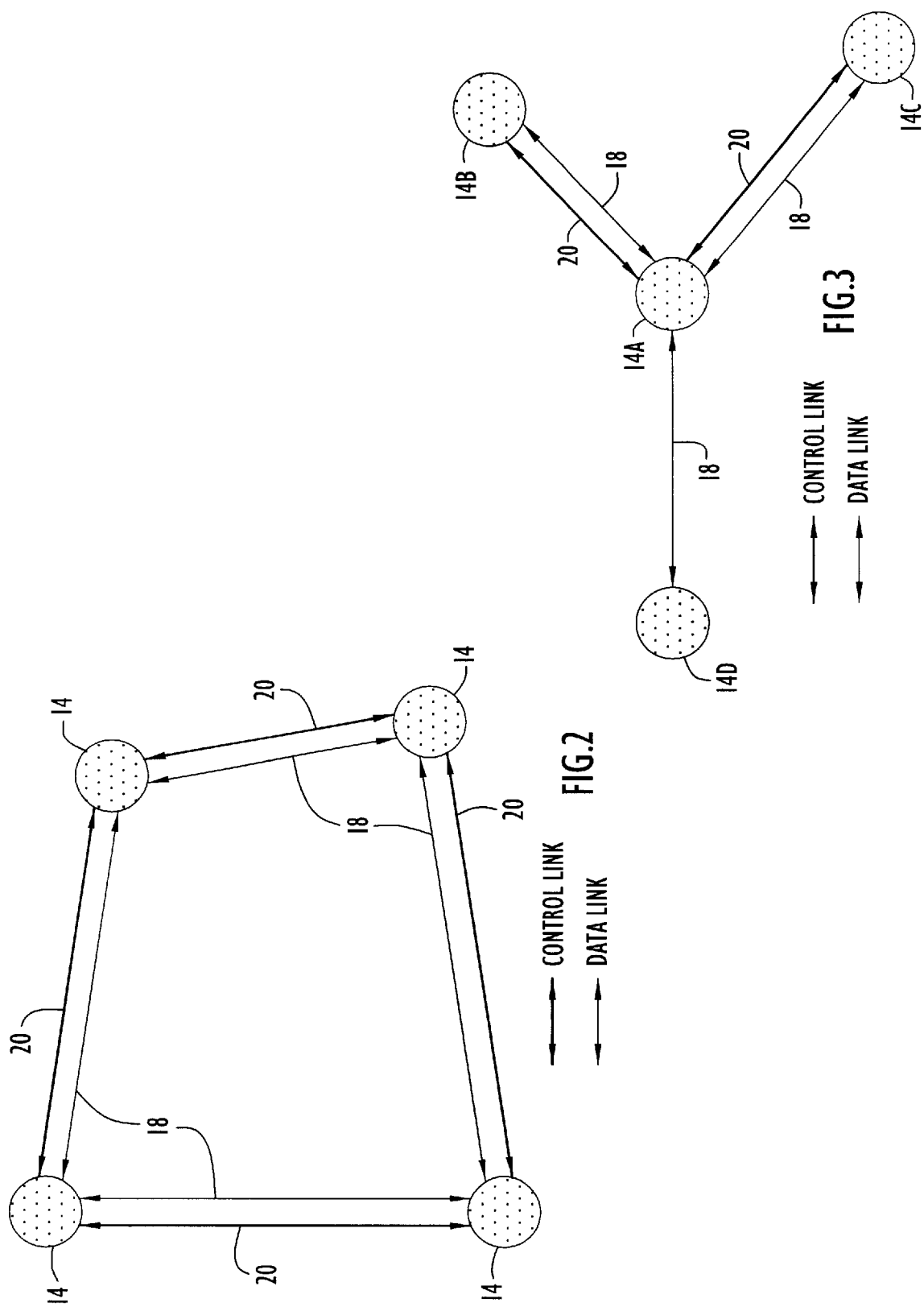

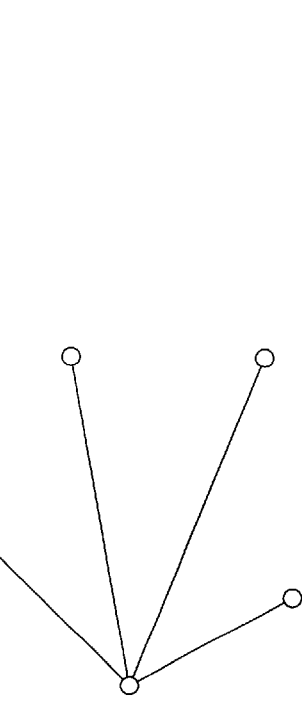
FIG.6A
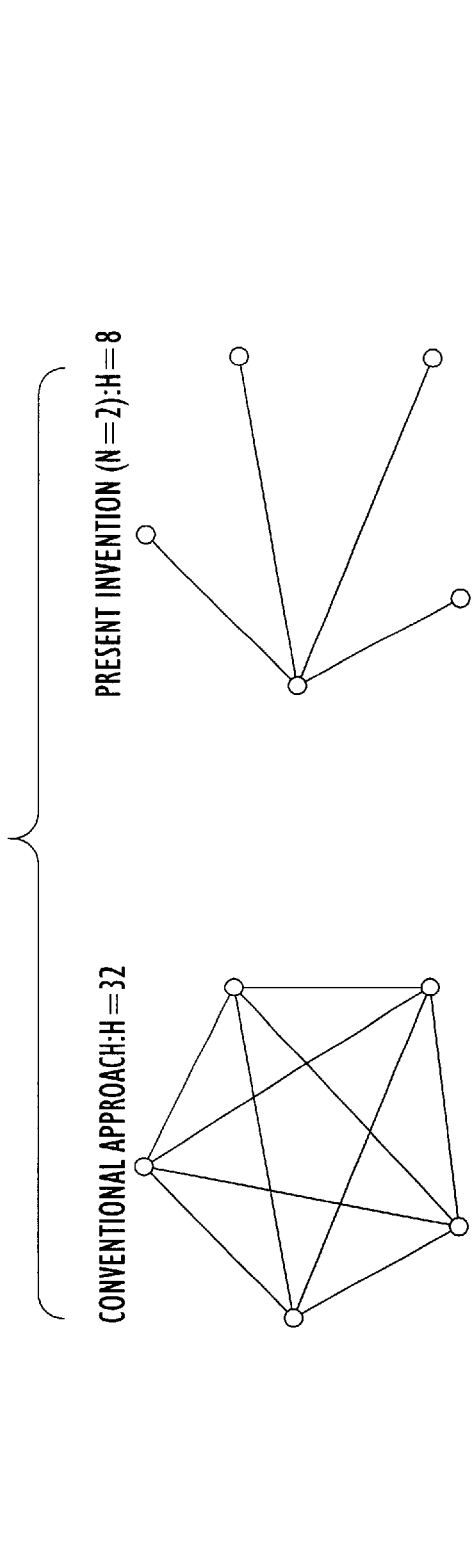
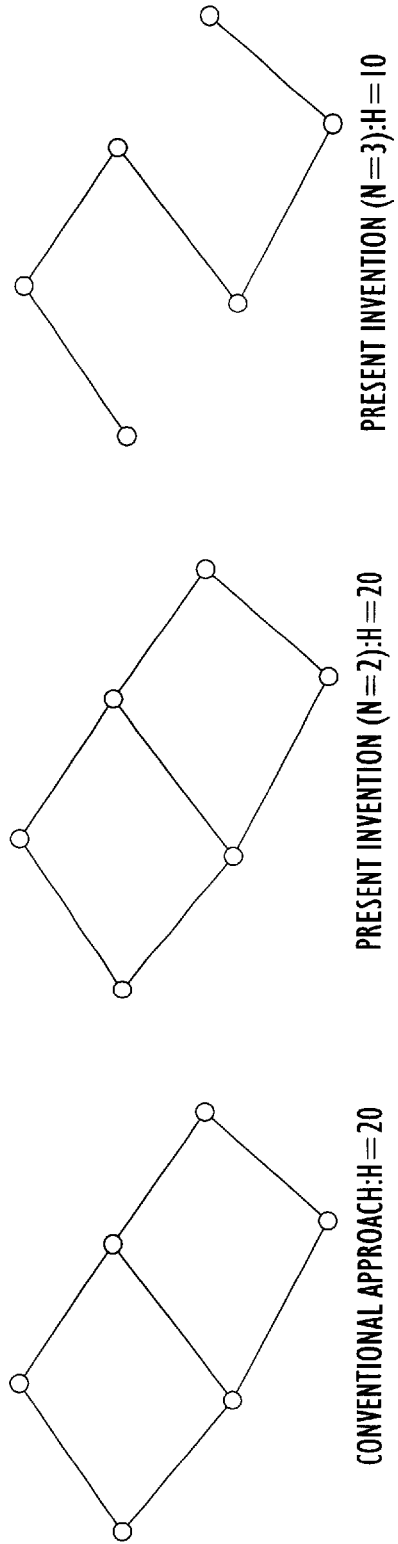
FIG.6B

METHOD AND APPARATUS FOR CONTROLLING COMMUNICATION LINKS BETWEEN NETWORK NODES TO REDUCE COMMUNICATION PROTOCOL OVERHEAD TRAFFIC

CROSS-REFERENCE TO RELATED APPLICATIONS

This application claims priority from U.S. Provisional Patent Application Serial No. 60/164,941, entitled "Control-Link Reduction Algorithm for Reduction of Intranet Layer Overhead" and filed Nov. 12, 1999. The disclosure of that provisional application is incorporated herein by reference in its entirety.

BACKGROUND OF THE INVENTION

1. Technical Field

The present invention pertains to communication systems. In particular, the present invention pertains to a communication system employing link-based flooding schemes for transmission of routing control information (e.g., to synchronize routing databases, facilitate message transmissions, etc.) with reduced communication protocol overhead traffic.

2. Discussion of Related Art

Generally, wireless networks may be arranged in a two-tier architecture similar to that of conventional cellular telephone systems. The first tier typically includes clusters or cells each including a plurality of communication nodes or cluster members. One node within each cluster is designated as a cluster head or base station. The second tier includes a backbone network formed of the cluster head nodes to enable communications between different clusters (e.g., for data transmitted over greater distances). The formation of clusters and designation of cluster head nodes is generally performed dynamically and in accordance with an intranet protocol (e.g., a protocol for communications within the two-tier network) that further performs routing functions within the network. In order to facilitate internet routing or routing between the two-tier and other external networks (e.g., the Internet), a modified version of the conventional Open Shortest Path First (OSPF) Protocol is employed. The OSPF protocol is basically a routing protocol employed for Internet Protocol (IP) type networks, while the modified protocol or Radio Open Shortest Path First (ROSPF) protocol is similar to OSPF, but is adapted for use with radio or wireless networks. For examples of implementation of the OSPF Protocol, reference is made to RFC 1583, Moy, "OSPF Version 2," March 1994, the disclosure of which is incorporated herein by reference in its entirety.

The intranet protocol is preferably a link-state type of routing protocol that is implemented on the backbone network. The cluster head nodes each include a database that is synchronized with other cluster head node databases by transference or flooding of Link-State Advertisement (LSA) packets in accordance with the protocol. These databases include information enabling the cluster head nodes to determine appropriate paths for routing messages through the network, while the LSA packets provide information to update the databases. Since the two-tier network is not a broadcast type network, LSA and other routing control packets are sent by a cluster head node as point-to-point messages to each of its cluster head neighbors.

The above-described technique for transmitting intranet protocol LSA and other routing control packets on a network suffers from several disadvantages. In particular, the intranet and ROSPF protocols each generate control traffic to maintain a functional network where the amount of control traffic increases with network size. With respect to the intranet protocol, the amount of overhead traffic depends on the average quantity of neighboring cluster head nodes and the size of the backbone network. In fact, the amount of intranet protocol overhead traffic increases at a significantly greater rate than network capacity as the size of the backbone network increases, thereby degrading network performance. Although the intranet protocol introduces additional overhead in initializing neighbors, the predominant portion of the overhead is attributed to the flooding or transmission of LSA and other routing control packets. Since network performance is affected by the control traffic, the network becomes unsuitable to transport user traffic or maintain a functioning state in the event that the control traffic approaches or exceeds the network capacity. This typically occurs when the size of the network is greater than approximately one-hundred fifty nodes where the backbone network size is proportional to the size of the network. Accordingly, since networks may employ on the order of approximately one-thousand nodes, the increased overhead limits network performance of small-scale networks and restricts deployment of the protocol for large-scale networks.

The present invention overcomes the aforementioned problems and achieves transmission of LSA and other routing control packets with a reduced rate of overhead increase in relation to backbone network and overall network size. This is accomplished by selectively controlling enablement of control links that facilitate transfer of routing control information between cluster head nodes within the backbone network. The present invention minimizes the impact of protocol overhead on network throughput, and permits the protocol to be utilized on large-scale wireless networks. Thus, networks may employ the protocol, while scaling to a greater size.

OBJECTS AND SUMMARY OF THE INVENTION

Accordingly, it is an object of the present invention to reduce the rate of overhead of a communication routing protocol and enable employment of the protocol with large-scale type networks.

It is another object of the present invention to selectively control enablement of control links for transference of routing control information between network nodes to reduce communication protocol overhead traffic and enhance communication network throughput.

Yet another object of the present invention is to synchronize routing databases of communication network nodes in a manner that minimally affects network throughput.

The aforesaid objects may be achieved individually and/or in combination, and it is not intended that the present invention be construed as requiring two or more of the objects to be combined unless expressly required by the claims attached hereto.

According to the present invention, Link-State Advertisement (LSA) and other routing control packets are transmitted within a wireless communication system or network via selective enablement of control links for transference of the packets between network nodes. Specifically, an exemplary wireless network includes a plurality of nodes arranged into clusters with each cluster having cluster member nodes and a designated cluster head node. The nodes communicate with each other via an intranet protocol, while the network may communicate with other external networks in accordance with an internetworking protocol (e.g., a modified version of the conventional Open Shortest Path First (OSPF) routing protocol, or a Radio Open Shortest Path First (ROSPF) protocol). A database within each network head node contains link information for that node. The LSA packets contain information to update the head node databases, while other routing control packets generally contain various routing information for network nodes to facilitate message transmissions. The routing control packets are transmitted to each head node to control routing functions and enable each database to maintain current information. In order to reduce overhead traffic due to transmission of numerous LSA and other routing control packets, the present invention selectively controls enablement of control links (e.g., links that transport routing control information) to transmit the LSA and other routing control packets to head nodes within the network. In other words, the present invention selectively reduces the quantity of control links between head nodes to transmit the LSA and other routing control packets with reduced protocol overhead traffic, thereby permitting the network to utilize link-state based protocols effectively (e.g., with minimal impact on network throughput) while expanding to larger scales.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 1A is a diagrammatic illustration of network nodes according to the present invention arranged in an exemplary communication network.

FIG. 1B is a block diagram of a network node of FIG. 1.

FIG. 2 is a diagrammatic illustration of an exemplary configuration of network nodes according to the present invention and the corresponding communication links between those nodes.

FIG. 3 is a diagrammatic illustration of an exemplary configuration of network nodes according to the present invention and the corresponding selectively controlled communication links between those nodes.

FIGS. 6A–6B are diagrammatic illustrations of exemplary network configurations indicating the corresponding overhead generated by the present invention for transmission of routing control packets through the configurations and the corresponding overhead generated by conventional techniques for transmitting those packets.

DETAILED DESCRIPTION OF THE PREFERRED EMBODIMENTS

Figure 4:
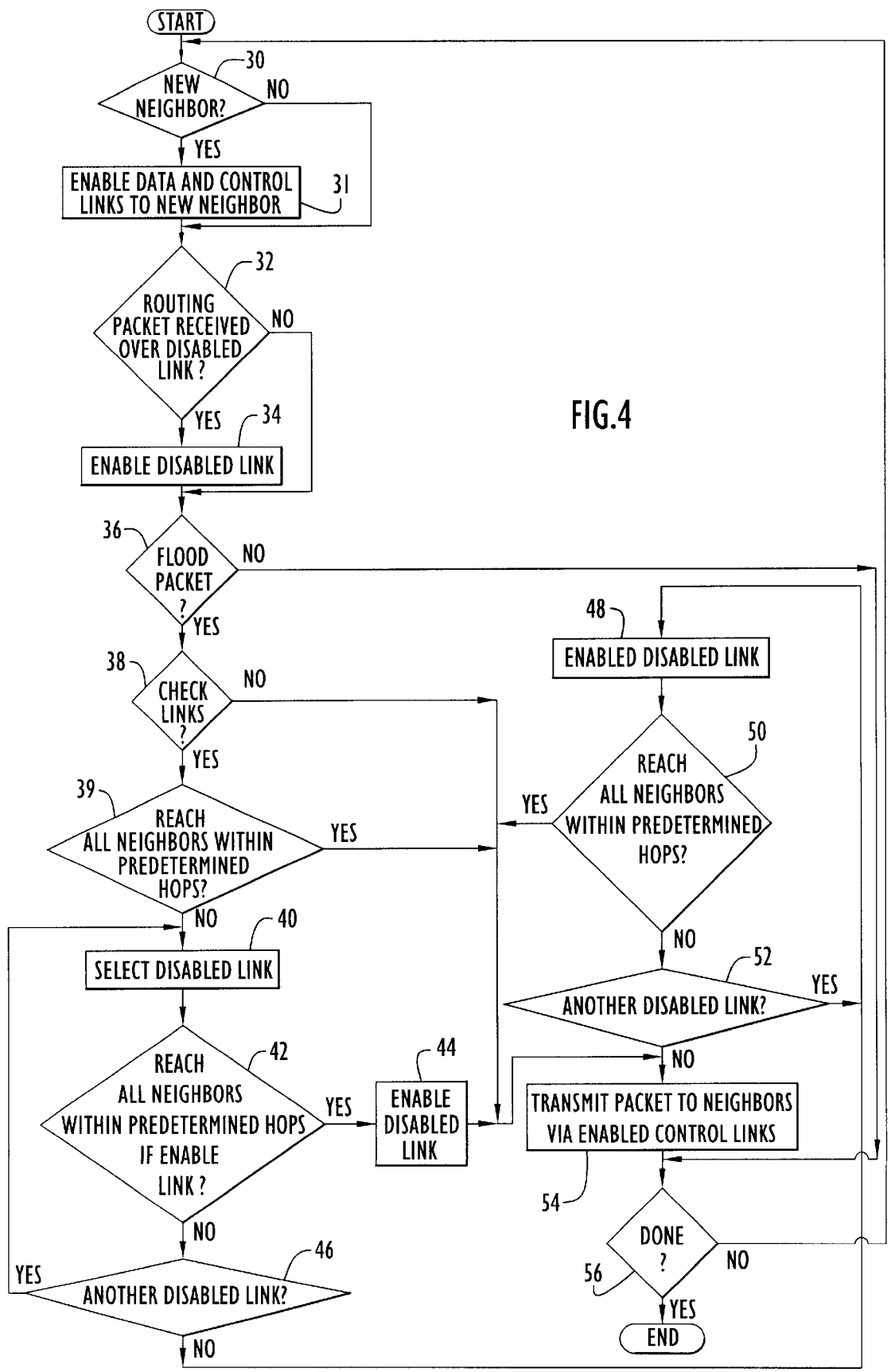
FIG. 4 is a procedural flow chart illustrating the manner in which a network node selectively controls enablement of control links to facilitate transmission of routing control packets to other network nodes according to the present invention.

Network nodes according to the present invention arranged in an exemplary two-tier wireless network are illustrated in FIG. 1A. Specifically, wireless network 2 includes a plurality of nodes 10 arranged in cells or clusters 12. Each cell or cluster includes corresponding cluster member nodes 10 with one of those cluster member nodes designated as a cluster head node or base station 14. These cluster arrangements form the first tier of network 2 and facilitate communication within a cluster between the cluster head and member nodes preferably utilizing a first transmission frequency. The head nodes of each cluster are in communication with each other, preferably utilizing a second transmission frequency, and form a backbone network 16. The backbone network essentially forms the second tier of network 2 and facilitates communications between nodes of different clusters (e.g., generally providing communications over greater distances). The architecture of network 2 is similar to that of conventional cellular telephone systems, except that network 2 employs an intranet protocol (e.g., a protocol for communications within the two-tier network) providing dynamic selection of cells and cluster head nodes as described below.

A network node 10 according to the present invention is illustrated in FIG. 1B. Specifically, node 10 includes a transmitter 22, a receiver 24 and a processor 26. The processor is preferably implemented by a conventional microprocessor or controller and controls the node to transmit and receive messages in accordance with the communication protocols described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. A present invention head node 14 is substantially similar to node 10 described above.

The arrangement of nodes 10 within clusters 12 and the designation of cluster head nodes 14 are dynamically determined by an intranet protocol that handles routing of packets within network 2. The intranet protocol is preferably a link-state type routing protocol that is implemented on backbone network 16. Cluster head nodes 14 each maintain a database including information enabling that cluster head to determine appropriate paths for routing messages through the network. The information typically relates to links between the various network nodes. The cluster head databases are synchronized in accordance with the protocol by transference of link-State Advertisement (LSA) packets between cluster head nodes that provide network information to update the databases. These packets are conventionally transmitted to each neighboring network node via plural point-to-point messages (e.g., messages from a source node to a specific destination network node) in response to changes in network topology, an external network connected to network 2 or other modifications to the network facilitating changes in a node database. When a database update packet is received, a point-to-point acknowledgment (ACK) packet is commonly transmitted to the source node from the destination node to indicate packet reception. In addition, each node (e.g., cluster head and member nodes) periodically broadcasts a beacon type or node status packet in accordance with the intranet protocol. This packet basically advertises the presence of a node within the network. The rate of transmission of a node status packet by a cluster head node is significantly greater than the transmission rate for that packet by a cluster member node since cluster head node status packets are typically utilized for "keep alive" and neighbor discovery purposes.

With respect to communications between network 2 and other external networks (e.g., the Internet), the network employs a Radio Open Shortest Path First (ROSPF) protocol. This protocol is basically a modified version of the conventional Open Shortest Path First (OSPF) protocol commonly utilized for Internet Protocol (IP) type networks. Since the OSPF protocol generates significant overhead when applied to ad-hoc networks (e.g., networks having temporary or wireless connections where communication devices are part of the network during a communication session or, in the case of mobile systems, while in proximity to the network), such as network 2, that protocol has been modified to derive the ROSPF protocol suitable for use with wireless or radio networks.

Referring to FIG. 2 communications between present invention network nodes, such as head nodes 14, are facilitated via communication links between those nodes. A communication link basically serves as a communication path to transfer data and control traffic between network nodes, and typically includes a logical data link 18 and a logical control link 20. Logical data link 18 accommodates transfer of user or other data between network nodes, while control link 20 accommodates transfer of routing and other control information for transmission of messages. Control links 20 are generally virtual since both data and control information are simultaneously transferred between network nodes via a communication link.

With reference to FIG. 3, a network node having only a data link 18 to a particular neighboring node is referred to herein as a "data only" neighbor, while a "data and control" neighbor refers herein to a node having both data and control links 18, 20 to the particular neighboring node. By way of example only, head nodes 14B, 14C and 14D are illustrated as routing neighbors of head node 14A. Head nodes 14B and 14C each include data and control links 18, 20 to transfer information between those nodes and head node 14A, while head node 14D includes a data link 18 to transfer data between that node and head node 14A. Thus, head nodes 14B and 14C are data and control neighbors of head node 14A, while head node 14D is a data only neighbor of head node 14A. Since routing control information is transmitted via control link 20, data only node 14D receives only data from head node 14A, whereas nodes 14B and 14C may receive data and control information from head node 14A.

Generally, LSA and other routing control packets or messages are conventionally transmitted by network head nodes as point-to-point messages to each of their neighboring head nodes in accordance with the intranet protocol as described above. The LSA packets provide information to update the databases, while other routing control packets typically include various routing information to facilitate message transmission. Neighboring head nodes receiving the transmitted routing control packet subsequently transmit that packet to their neighboring head nodes in a like manner to facilitate flooding of that packet within the network. As a result, each head node (e.g., and corresponding member nodes receiving routing information from that head node) within the network may receive a maximum of 'M' copies of the same routing control packet, where 'M' is generally an integer greater than zero and represents the quantity of head node neighbors associated with a particular head node. Thus, the amount of routing traffic introduced by this technique is proportional to the average quantity of cluster head neighbors 'Z' (e.g., where 'Z' is generally an integer greater than or equal to zero) for backbone network 16. Although routing traffic may be reduced by limiting the quantity of cluster head neighbors 'Z' within a network, this scheme reduces user data throughput since that throughput is proportional to the cluster head neighbor quantity.

Accordingly, the present invention minimizes the amount of routing control traffic without reduction of user throughput. Since the routing control traffic is proportional to the quantity of control links or data and control cluster head neighbors within a network, the present invention basically reduces the quantity of control links (e.g., while maintaining the quantity of data links) within the network to reduce the amount of routing control traffic without affecting user throughput. In other words, the present invention maintains enablement of data links and selectively controls enablement of control links to reduce routing control traffic as described below. Since control links are virtual as described above, an enabled control link basically refers to a communication link utilized by a head node for transmission of both data and routing control information, while a disabled control link refers to a communication link utilized by a head node for transmission of only user or other data. The present invention typically applies to transmission or flooding of messages via plural point-to-point messages. However, the present invention may be applied to any type of broadcast transmissions to reduce traffic associated with the broadcasted message and associated broadcast or point-to-point acknowledgments, such as the various broadcast techniques disclosed in co-pending U.S. Patent Applications Ser. No. 09/704,711 entitled "Method and Apparatus for Broadcasting Messages in Channel Reservation Communication Systems" and filed Nov. 3, 2000, and entitled "Method and Apparatus for Transmission of Node Link Status Messages Throughout a Network With Reduced Communication Protocol Overhead Traffic" and filed Nov. 6, 2000. The disclosures of those applications are incorporated herein by reference in their entireties.

The manner in which a head node processor facilitates enablement of control links between network head nodes to facilitate transmission or flooding of routing control packets is illustrated in FIG. 4. Initially, control and data links are enabled between the head node and a new neighboring head node at step 31 in response to determining the presence of the new neighbor at step 30. The neighboring head node is typically discovered by receipt of an intranet protocol beacon type packet as described above. Further, a disabled control link is enabled at step 34 in response to determining at step 32 that a routing control packet has been received via that disabled control link. This facilitates link coordination between head nodes and basically ensures that a selectively enabled control link of a head node is further enabled with respect to the other head node associated with that control link (e.g., prevents a control link from having an enabled status with respect to a first head node associated with the control link and a disabled status with respect to the other head node associated with that control link). Specifically, when a routing control packet is to be transmitted as determined at step 36, the head node processor determines at step 38 whether or not a control link examination has occurred within a predetermined time interval as indicated by a link timer. Typically, a head node periodically checks the integrity of its associated control links to ensure that the control links are viable for transmission of the routing control packet to other head nodes. The time interval between successive control link inspections may be set to any desired interval and is typically dependent upon the application, type of network, type of node processor and other network considerations. For example, a dynamic or volatile network generally requires frequent control link inspections and, therefore, a lesser time interval between those inspections. Conversely, a stable network generally requires less frequent control link inspections, thereby permitting a greater time interval between those inspections. The time interval is maintained by the link timer and preferably has a value on the order of seconds or minutes. However, the link timer and time interval may be set to any desired values (e.g., seconds, minutes, hours, days, etc.).

In response to expiration of the link timer as determined at step 38, the head node processor examines its associated control links to ensure viability for transmission of the routing control packet. In particular, the head node processor determines at step 39 whether or not the head node may communicate with each of its neighbors (e.g., data only and data and control head node neighbors) via control links within a predetermined quantity of hops or hop limit (e.g., re-transmissions by neighboring head nodes required to enable communication with the head node's neighbors). In other words, the processor determines if a packet may be transmitted from the head node to each of its head node neighbors either directly (e.g., to data and control neighbors via control links with those neighbors) or indirectly (e.g., to data only neighbors via control links of head nodes of succeeding hops receiving the packet) within the hop limit. This determination is accomplished by the head node processor examining information within the corresponding head node database pertaining to network connections. Basically, the head node processor examines the network connectivity information within the database to determine routing paths for communicating with neighboring nodes, thereby providing an indication of the quantity of hops required to facilitate that communication. The hop limit or threshold may be set to any desired value and is generally dependent upon the type of application and network, network parameters and other network characteristics or conditions.

When the head node cannot communicate with each of its neighbors within the hop limit as described above, the head node processor selectively enables disabled control links to facilitate communication with its head node neighbors via control links within that hop limit. Specifically, the head node processor selects and examines a disabled control link at step 40 and determines at step 42 whether or not the head node may communicate with each of its head node neighbors (e.g., data and control and data only neighbors) via control links within the hop limit as described above in response to enabling the selected disabled control link. In response to determining that the head node may communicate with each of its neighboring head nodes within the hop limit, the selected disabled control link is enabled at step 44. Otherwise, another disabled control link is selected and examined in the manner described above in response to determining the presence of additional disabled control links associated with the head node at step 46.

If the head node cannot communicate with each of its head node neighbors within the hop limit by enabling a disabled control link as described above, the head node processor proceeds to successively enable disabled control links until communications may be established with each head node neighbor within the hop limit. Specifically, a selected disabled control link is enabled at step 48, and the head node processor determines at step 50 whether or not the head node may communicate with each of its neighboring head nodes within the hop limit as described above. If communications with each head node neighbor cannot be established within the hop limit, a successive disabled control link is selected and enabled for the above determination in response to determining the presence of an additional disabled control link associated with the head node at step 52. The above process of enabling successive disabled control links is repeated until communications with each neighboring head node can be established within the hop limit. Since the head node may communicate with each of its neighboring head nodes when each control link is enabled, communications between the head node and each of its head node neighbors within the hop limit is at least attained when each disabled link becomes enabled by the above process.

In response to sufficient enabled control links to facilitate communications with head node neighbors as determined at steps 39, 42 or 50, or in response to having examined the control links within the predetermined time interval as determined at step 38, a routing control packet is transmitted to each neighboring head node as a point-to-point message at step 54 via the enabled control links. The above-described process for selectively enabling control links is repeated until termination of node processing (e.g., node power down or other event) as determined at step 56.

Figure 5A:
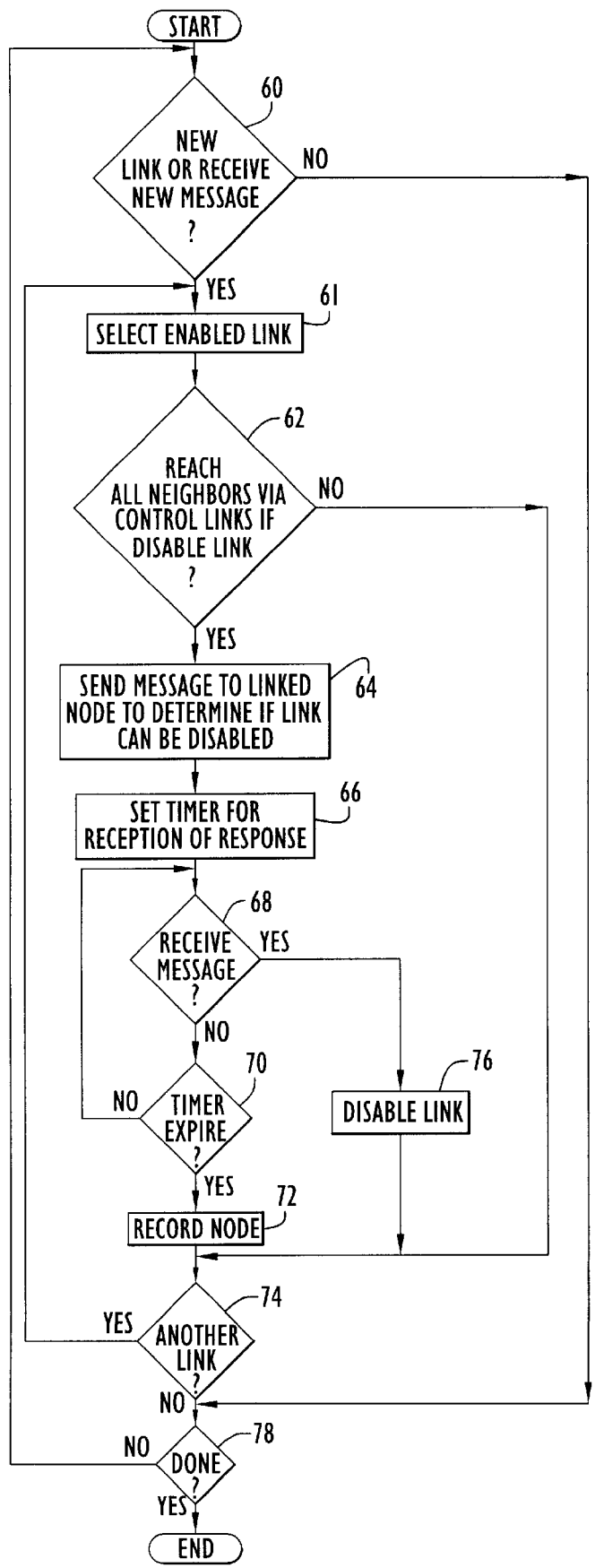
FIG. 5A is a procedural flow chart illustrating the manner in which a network node selectively disables control links to reduce protocol overhead traffic according to the present invention.

The manner in which a head node processor facilitates disablement of control links to reduce protocol overhead traffic is illustrated in FIG. 5A. Initially, a head node examines and reduces the quantity of its control links in response to enablement of a new control link associated with that head node or receipt of a new routing control packet (e.g., containing information related to changes in network connectivity). In this fashion, the head node processor basically evaluates control links in response to network connectivity changes to ensure the presence of a minimal, yet sufficient, quantity of control links for transmission of routing control information. In effect, the control link evaluation is performed by the head node processor on an "on-demand" basis (e.g., in response to events initiating or affecting transmission of routing control information) prior to transmission of routing control information in order to reduce node processing and facilitate reduced protocol overhead traffic. Since control links facilitate transmission of routing control information, a reduction in the quantity of enabled control links lessens the amount of messages required to flood or transmit the routing information within the network, thereby reducing control traffic.

Accordingly, the head node processor determines the presence of a new control link or new routing control message at step 60. If a new control link or message is present, the head node processor examines enabled control links in order to reduce the quantity of control links and routing traffic. Specifically, an enabled control link is selected at step 61 and the head node processor determines at step 62 whether or not the head node may communicate with its head node neighbors via control links within the prescribed hop limit as described above in response to disabling the selected link. If communications may be established with each head node neighbor within the hop limit, a disable request message is transmitted at step 64 to the neighboring head node associated with the selected control link. The message basically includes a request to the neighboring head node to determine whether or not the selected control link may be disabled (e.g., to determine whether or not the selected control link is required by the neighboring head node to communicate with each of its head node neighbors within the hop limit as described above). A reply timer is subsequently set at step 66 to maintain a predetermined time interval in which to receive a reply to the transmitted disable request message. If a reply is received within the time interval as determined at step 68, the selected link is disabled at step 76. Basically, the neighboring head node transmits a reply in response to determining that the selected control link may be disabled as described below. If a reply is not received within the reply time interval and the reply timer expires as determined at step 70, the head node records the event at step 72 to indicate the necessity of the selected control link for the neighboring head node with respect to subsequent attempts to disable that control link. In response to the presence of additional enabled links associated with the head node as determined at step 74, the head node processor evaluates and disables those links in the manner described above to reduce control traffic. The above process for disabling control links is repeated until termination of node processing (e.g., power down or other event) as determined at step 78.

Figure 5B:
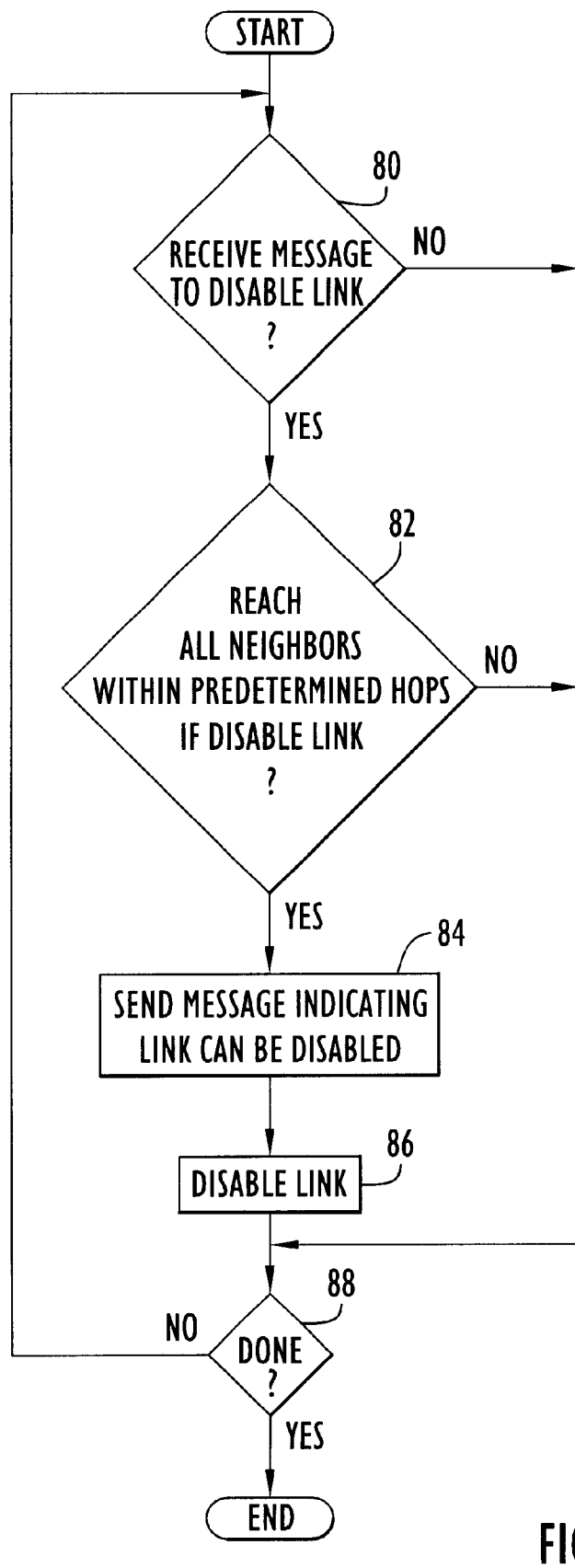
FIG. 5B is a procedural flow chart illustrating the manner in which a network node receives and processes a disable request message to disable a control link according to the present invention.

The manner in which a head node processor receives and processes a control link disable request message is illustrated in FIG. 5B. Initially, the head node processor determines at step 80 whether or not a disable request message has been received from an associated head node requesting disablement of a selected control link. In response to receiving the disable request message, the head node determines at step 82 whether or not communications with each neighboring head node may be established within the prescribed hop limit as described above in the event that the selected control link is disabled. If communications with each head node neighbor may be established within the hop limit, the head node transmits a reply message to the associated head node at step 84 indicating that the selected control link may be disabled, and subsequently disables the selected control link at step 86. When no reply message is transmitted within the reply time interval, the associated head node interprets this action as an indication that the selected control link is to maintain its active state. The above process for processing disable request messages is repeated until termination of node processing (e.g., power down or other event) as determined at step 88.

Basically, the present invention selectively controls communication links between head nodes to reduce routing protocol overhead traffic as described above. This typically includes selectively enabling and/or disabling control links to reduce overhead traffic, while maintaining data links in an enabled state to thereby facilitate direct transmission of user or other data between linked nodes and minimize impact on data throughput. Since control links are virtual as described above, enablement of a control link basically indicates that a head node transmits routing control information directly to a neighboring head node via the enabled link. Conversely, a disabled control link basically indicates that the link is a data link and a head node may directly transmit only user or other data to a neighboring head node via the disabled link. In addition, head nodes initiating link modifications (e.g., enabling or disabling communication links) each transmit an LSA type packet throughout the network to indicate the change in network connectivity and synchronize node databases. Since fewer control links are employed by the present invention, the quantity of point-to-point messages required to transmit or flood routing control information throughout the network is reduced, thereby reducing overhead traffic.

Significant reductions in network routing control traffic may be achieved by the present invention. This is accomplished by reducing the quantity of control links facilitating transfer of routing control information as described above, which, in effect, reduces the amount of point-to-point messages required for transmitting or flooding a routing control packet through the network. Byway of example only, FIGS. 6A–6B illustrate exemplary network configurations with corresponding quantities of point-to-point messages, 'H' (e.g., where 'H' generally is an integer greater than zero), required to flood a routing control packet (e.g., an LSA packet) throughout the associated configuration. Receipt of the routing control packet by receiving nodes is indicated by transmission of acknowledgment packets by those nodes as described above. Referring to the exemplary configuration of FIG. 6A, the conventional approach described above for transmitting routing control packets requires thirty-two point-to-point messages to flood a packet through the corresponding network configuration, while the present invention requires eight point-to-point messages utilizing a hop limit of two hops to transmit the packet through that configuration. Similarly, the conventional approach requires twenty point-to-point messages to flood a routing control packet within the configuration of FIG. 6B, while the present invention requires a similar quantity of point-to-point messages for a two hop limit, but requires only ten point-to-point messages utilizing a hop limit of three hops. The reduction in routing control overhead achieved by the present invention is generally proportional to the quantity of hops or hop limit, 'N' (e.g., where 'N' generally is an integer greater than zero), utilized to determine the feasability of enabling or disabling a control link. Although a greater quantity of control links are generally disabled with an increased hop limit, the enlarged limit increases the computational load of a head node processor since the determination to enable or disable a control link depends on the status of a greater quantity of control links.

It is to be understood that the present invention is not limited to the protocols or networks described herein, but may be applicable to other networks or applications, especially those employing link-state based routing protocols. Further, the present invention may be applied to any applications requiring flooding of routing or other control information (e.g., synchronization of databases). In addition, the present invention network nodes may be arranged to form any flat or plural tier network configuration and may transmit routing control information throughout that network configuration in the manner described above to reduce protocol overhead traffic. The transmission technique described above for the head nodes may be implemented by any type of nodes at any hierarchical tiers (e.g., by nodes of the same or different tiers) of a configuration. For example, each node of a flat network may implement the transmission technique described above, while head and/or member nodes may similarly implement that technique individually among the same type of nodes or in any combination.

It will be appreciated that the embodiments described above and illustrated in the drawings represent only a few of the many ways of implementing a method and apparatus for controlling communication links between network nodes to reduce communication protocol overhead traffic.

The communication networks employing the present invention nodes may include any quantity of those nodes or tiers. The present invention network nodes may be arranged to form any flat or plural tier network configuration and may transmit routing control information throughout that network configuration in the manner described above to reduce protocol overhead traffic. The network nodes may be arranged in any fashion into any quantity of clusters or cells each having any quantity of nodes and head nodes. The backbone network may include any quantity of head nodes, while communications within a cluster and between neighboring cluster head nodes of the backbone network may utilize the same or different transmission frequencies. The formation of cells and designation of head nodes may be predetermined or accomplished dynamically via any conventional or other algorithm or technique. The nodes may communicate via any suitable communications medium (e.g., wired or wireless communication devices, etc.). The present invention node may include any quantity of conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals, etc.). Alternatively, the present invention node may include any quantity of combined transmitting/receiving devices.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate distribution of packets within the network in the manner described above.

The LSA, routing control, node status and other packets or messages (e.g., acknowledgment, point-to-point message, broadcast message, disable request message, reply message, etc.) may be of any size, may have any format, and may contain any desired information. The packets may be transmitted at any suitable transmission rate or have any desired interval between transmissions. The timers (e.g., link, reply, etc.) may be implemented by any conventional or other timing mechanisms (e.g., processor clock, external hardware, software, etc.) and may be set to any desired intervals (e.g., fractions of seconds, seconds, minutes, hours, days, etc.) for their respective functions (e.g., inspecting links, receiving a reply in response to a disablement request, etc.). Further, the various messages may include any identifier to identify the type of message or packet. The beacon type packets may be transmitted at any desired intervals and/or in response to any desired events or conditions.

The communication network may employ any suitable intranet and/or internetworking communications protocols to facilitate reception, processing and transference of messages or packets within or external of the network. The present invention may be utilized within any intranet, internetworking or other protocol to transmit or flood messages within the network in accordance with that protocol. The node database may be implemented by any conventional database or other storage structure (e.g., processor memory, external memory, file, data structure (e.g., array, queue, stack, etc.), etc.) and may have any desired storage capacity to contain any desired information. Events (e.g., a selected link of a denied disablement request) may be recorded in any conventional or other storage unit or structure (e.g., processor memory, external memory, file, data structure (e.g., linked list, record, array, queue, stack, etc.), etc.) having any desired storage capacity to store any desired information.

The hop limit or threshold may be set to any desired value to achieve a particular throughput. Further, the hop limit and timers (e.g., link, reply, etc.) maybe dynamically adjusted by a node based on network or other conditions. Control links may be enabled and/or disabled in any desired sequence via any techniques (e.g., random, identifier order, etc.) and in response to any suitable conditions (e.g., changes in network connectivity, periodically controlled in response to expiration of a timer, etc.). Further, a link may be enabled by each of its associated nodes via any coordination technique (e.g., message transfer, receipt of control information on a data link, at pre-arranged times, timers, etc.). Similarly, a link may be disabled by each of its associated nodes via any coordination technique (e.g., message transfer, at pre-arranged times, timers, etc.). A communication link may include any quantity of data, control and/or any other type of logical links in any desired combination to transfer any desired information. The links may each be virtual or actual, while the data or other links may similarly each be selectively controlled to enhance network throughput. The data, control and other links may each transfer any desired information, while a communication link (e.g., data, control and other links) may be associated with or establish communication between any desired quantity of any types of nodes. Moreover, the logical links of a communication link may be associated with any quantity of the same or different nodes.

It is to be understood that the present invention is not limited to the applications or networks described herein, but may be utilized for various communication applications or networks, especially those employing link-state based routing protocols. Further, the present invention may be applied to any applications requiring flooding of routing or any type of control or other information. Moreover, the present invention may be applied to node transmissions of any type of point-to-point, broadcast or other messages to reduce overhead traffic associated with the transmitted message and any associated broadcast, point-to-point or other acknowledgments.

From the foregoing description, it will be appreciated that the invention makes available a novel method and apparatus for controlling communication links between network nodes to reduce communication protocol overhead traffic wherein control links facilitating transference of routing control information between network nodes are selectively controlled to flood routing control information within a network with reduced communication protocol overhead.

Having described preferred embodiments of a new and improved method and apparatus for controlling communication links between network nodes to reduce communication protocol overhead traffic, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network, a communication unit including a communication link with each neighboring communication unit within said network to facilitate network communications, wherein each said communication link facilitates transfer of data and is selectively controllable to further facilitate transfer of control messages, said communication unit comprising:

a transmitter to transmit an outgoing message to each said neighboring unit via a corresponding communication link;

a receiver to receive an incoming message from each said neighboring unit via a corresponding communication link; and a processor to control said transmission and reception of said outgoing and incoming messages, wherein said processor includes:

a communications module to examine network connectivity and determine particular communication links associated with said communication unit sufficient to enable transmission of a control message over said network to each said neighboring unit within a predetermined quantity of hops;

a link control module to control said communication links associated with said communication unit in accordance with said determination, wherein each communication link is controlled to facilitate transmission of data and said particular communication links are controlled to further facilitate transmission of said control message to corresponding neighboring units; and a transmission module to facilitate transmission of said control message throughout said network by transmitting said control message via said particular communication links to corresponding neighboring units.

2. The unit of claim 1 wherein said transmitter transmits said outgoing message in the form of radio signals.

3. The unit of claim 1 wherein said receiver receives said incoming message in the form of radio signals.

4. The unit of claim 1 further including a storage unit to store information indicating said network connectivity, and said communications module includes:

an evaluation module to analyze said network connectivity information to determine said particular communication links.

5. The unit of claim 1 wherein said control message includes routing control information.

6. The unit of claim 4 wherein said control message includes information relating to changes in network connectivity to synchronize storage units of said network communication units.

7. In a communications network, a communication unit including a communication link with each neighboring communication unit within said network to facilitate network communications, wherein each said communication link includes a data link for transferring data and a control link for transferring control messages, said communication unit comprising:

a transmitter to transmit an outgoing message to each said neighboring unit via a corresponding communication link;

a receiver to receive an incoming message from each said neighboring unit via a corresponding communication link; and a processor to control said transmission and reception of said outgoing and incoming messages, wherein said processor includes:

a communications module to examine network connectivity and determine particular communication links associated with said communication unit sufficient to establish communications via said network with each said neighboring unit within a predetermined quantity of hops;

a link control module to control said communication links in accordance with said determination, wherein said particular communication links are controlled to transmit a control message to corresponding neighboring units, and wherein said link control module includes:

a data link module to enable said data link of each said communication link associated with said communication unit; and a control link module to control said control links of said communication links to facilitate transmission of said control message over said particular communication links to corresponding neighboring units and throughout said network; and a transmission module to facilitate transmission of said control message throughout said network by transmitting said control message via said particular communication links to corresponding neighboring units.

8. The unit of claim 7 wherein said link control module further includes:

a neighbor determination module to determine the presence of a new neighboring unit; and a link initiation module to provide a communication link between said communication unit and said new neighboring unit and to enable said data and control links of said provided communication link in response to determining the presence of said new neighboring unit.

9. The unit of claim 7 wherein said link control module further includes:

a control link enablement module to enable a disabled control link in response to said communication unit receiving said control message via that disabled control link.

10. The unit of claim 7 wherein said processor further includes:

a control link status module to determine, prior to transmission of said control message, viability of said communication links for establishing communications with each said neighboring unit via said network within said predetermined quantity of hops in response to expiration of a predetermined time interval.

11. The unit of claim 10 wherein said control link status module includes:

a control link selection module to select successive disabled control links and enable a selected disabled control link in response to determining that said communication links are not viable and communications between said communication unit and each neighboring unit can be established within said predetermined quantity of hops with said selected link enabled; and a control link enablement module to enable successive disabled control links until communications between said communication unit and each neighboring unit are established within said predetermined quantity of hops in response to no disabled control link being enabled by said control link selection module.

12. The unit of claim 7 wherein said processor further includes:

a control link status module to examine said communication links and determine said particular communication links in response to enablement of a control link or receipt of a message indicating changes in network connectivity.

13. The unit of claim 12 wherein said control link status module includes:

a control link disablement module to select each enabled control link successively and disable that enabled control link in response to determining that communications between said communication unit and each neighboring unit can be established within said predetermined quantity of hops with that selected control link disabled.

14. The unit of claim 13 wherein said control link disablement module includes:
   a control link selection module to successively select each enabled control link;
   a link evaluation module to determine viability of establishing communications between said communication unit and each neighboring unit within said predetermined quantity of hops with a selected control link disabled;
   a request module to facilitate transmission of a request message to a neighboring unit associated with said selected control link to request disablement of said selected control link; and
   a disablement module to disable said selected control link in response to receiving a reply message from said associated neighboring unit permitting disablement of said selected link.

15. The unit of claim 14 wherein said control link disablement module further includes:
   a record module to record a disablement attempt in response to expiration of a reply timer prior to receiving said reply message from said associated neighboring unit.

16. The unit of claim 14 wherein said processor further includes:
   a reception module to facilitate reception and processing of messages including said request message, wherein said reception module includes:
   a disablement request module to receive said request message from a neighboring unit and disable a control link indicated in said request message in response to determining that communications between said communication unit and each neighboring unit can be established within said predetermined quantity of hops with said indicated control link disabled.

17. The unit of claim 16 wherein said disablement request module includes:
   a request reception module to receive said request message from said neighboring unit;
   a disabled link evaluation module to determine viability of establishing communications between said communication unit and each neighboring unit within said predetermined quantity of hops with said indicated control link disabled; and
   a link disablement module to facilitate transmission of said reply message to said neighboring unit indicating that said indicated control link may be disabled and to disable said indicated control link in response to said determination of viable communications with each neighboring unit.

18. The unit of claim 1 wherein said communications network includes a plurality of clusters each having said communication unit as a head unit and a plurality of communication units being designated as member units, wherein head units of said clusters communicate with each other via said communication links to facilitate communications throughout said network.

19. In a communications network employing a communication link between each neighboring communication unit within said network, wherein each said communication link facilitates transfer of data and is selectively controllable to further facilitate transfer of control messages, a method of transmitting and receiving messages by a communication unit within said network comprising the steps of:
   (a) examining network connectivity and determining particular communication links associated with said communication unit sufficient to enable transmission of a control message over said network to each corresponding neighboring unit within a predetermined quantity of hops;
   (b) controlling said communication links associated with said communication unit in accordance with said determination, wherein each associated communication link is controlled to facilitate transmission of data and said particular communication links are controlled to further facilitate transmission of said control message to corresponding neighboring units; and
   (c) facilitating transmission of said control message throughout said network by transmitting said control message via said particular communication links to corresponding neighboring units.

20. The method of claim 19 wherein step (c) further includes:
   (c.1) transmitting said control message in the form of radio signals.

21. The method of claim 19 wherein said communication unit includes a storage unit to store information indicating said network connectivity, and step (a) further includes:
   (a.1) analyzing said network connectivity information to determine said particular communication links.

22. The method of claim 19 wherein said control message includes routing control information.

23. The method of claim 21 wherein said control message includes information relating to changes in network connectivity, and step (c) further includes:
   (c.1) transmitting said control message throughout said network to synchronize storage units of said network communication units.

24. In a communications network employing a communication link between each neighboring communication unit within said network, wherein each said communication link includes a data link for transferring data and a control link for transferring control messages, a method of transmitting and receiving messages by a communication unit within said network comprising the steps of:
   (a) examining network connectivity and determining particular communication links associated with said communication unit sufficient to establish communications via said network with each corresponding neighboring unit within a predetermined quantity of hops;
   (b) controlling said communication links associated with said communication unit in accordance with said determination, wherein said particular communication links are controlled to transmit a control message to corresponding neighboring units, and wherein step (b) further includes:
   (b.1) enabling said data link of each said communication link associated with said communication unit; and
   (b.2) controlling said control links of said associated communication links to facilitate transmission of said control message over said particular communication links to corresponding neighboring units and throughout said network; and
   (c) facilitating transmission of said control message throughout said network by transmitting said control message via said particular communication links to corresponding neighboring units.

25. The method of claim 24 wherein step (b) further includes:
  (b.3) determining the presence of a new neighboring unit; and
  (b.4) providing a communication link between said communication unit and said new neighboring unit and enabling said data and control links of said provided communication link in response to determining the presence of said new neighboring unit.

26. The method of claim 24 wherein step (b) further includes:
  (b.3) enabling a disabled control link in response to said communication unit receiving said control message via that disabled control link.

27. The method of claim 24 wherein step (b) further includes:
  (b.3) determining, prior to transmission of said control message, viability of said communication links for establishing communications with each said neighboring unit via said network within said predetermined quantity of hops in response to expiration of a predetermined time interval.

28. The method of claim 27 wherein step (b.3) further includes:
  (b.3.1) selecting successive disabled control links and enabling a selected disabled control link in response to determining that said communication links are not viable and communications between said communication unit and each neighboring unit can be established within said predetermined quantity of hops with said selected link enabled; and
  (b.3.2) enabling successive disabled control links until communications between said communication unit and each neighboring unit are established within said predetermined quantity of hops in response to no disabled control link being enabled in step (b.3.1).

29. The method of claim 24 wherein step (b) further includes:
  (b.3) examining said communication links and determining said particular communication links in response to enablement of a control link or receipt of a message indicating changes in network connectivity.

30. The method of claim 29 wherein step (b.3) further includes:
  (b.3.1) selecting each enabled control link successively and disabling that enabled control link in response to determining that communications between said communication unit and each neighboring unit can be established within said predetermined quantity of hops with that selected control link disabled.

31. The method of claim 30 wherein step (b.3.1) further includes:
  (b.3.1.1) successively selecting each enabled control link;
  (b.3.1.2) determining viability of establishing communications between said communication unit and each neighboring unit within said predetermined quantity of hops with a selected control link disabled;
  (b.3.1.3) facilitating transmission of a request message to a neighboring unit associated with said selected control link to request disablement of said selected control link; and
  (b.3.1.4) disabling said selected control link in response to receiving a reply message from said associated neighboring unit permitting disablement of said selected link.

32. The method of claim 31 wherein step (b.3.1) further includes:
  (b.3.1.5) recording a disablement attempt in response to expiration of a reply timer prior to receiving said reply message from said associated neighboring unit.

33. The method of claim 31 further including:
  (d) processing messages received from said neighboring units.

34. The method of claim 33 wherein said received messages include said request message, and step (d) further includes:
  (d.1) receiving said request message from a neighboring unit and disabling a control link indicated in said request message in response to determining that communications between said communication unit and each neighboring unit can be established within said predetermined quantity of hops with said indicated control link disabled.

35. The method of claim 34 wherein step (d.1) further includes:
  (d.1.1) receiving said request message from said neighboring unit;
  (d.1.2) determining viability of establishing communications between said communication unit and each neighboring unit within said predetermined quantity of hops with said indicated control link disabled; and
  (d.1.3) transmitting said reply message to said neighboring unit indicating that said indicated control link may be disabled and to disable said indicated control link in response to viable communications with each neighboring unit.

36. The method of claim 19 wherein said communications network includes a plurality of clusters each having said communication unit as a head unit and a plurality of communication units being designated as member units, wherein head units of said clusters communicate with each other via said communication links to facilitate communications throughout said network.

37. A communications network comprising:
  a plurality of nodes each having a communication link between that node and each of its neighboring nodes to facilitate network communications, wherein each said communication link facilitates transfer of data and is selectively controllable to further facilitate transfer of control messages;
  wherein each said node includes:
    an evaluation module to determine particular communication links associated with that node and sufficient to enable transmission of a control message over said network to corresponding neighboring nodes within a predetermined hop limit based on network connectivity; and
    a link control module to selectively control said associated communication links in accordance with said determination to enable said particular communication links to facilitate transmission of a control message from that node to each of its neighboring nodes to propagate said control message through said network by succeeding nodes receiving that message, wherein each associated communication link is controlled to facilitate transfer of data and said particular communication links are controlled to further facilitate transmission of said control message.

38. The network of claim 37 wherein each said node transmits said control message in the form of radio signals.

39. The network of claim 37 wherein each said node includes a storage unit to store information relating to network connectivity and said control message includes information relating to changes in network connectivity to synchronize storage units of said network nodes.

40. A communications network comprising:
   a plurality of nodes each including a communication link between that node and each of its neighboring nodes to facilitate network communications, wherein each said communication link includes a data link for transferring data and a control link for transferring control messages;
   wherein each said node includes:
      an evaluation module to determine particular communication links associated with that node and sufficient to establish communications via said network to corresponding neighboring nodes within a predetermined hop limit based on network connectivity; and
      a link control module to selectively control said associated communication links in accordance with said determination to enable said particular communication links to facilitate transmission of said control message from that node to each of its neighboring nodes to propagate said control message through said network by succeeding nodes receiving that message, wherein said link control module includes:
         a data link module to enable said data link of each said associated communication link; and
         a control link module to control said control links of said associated communication links to facilitate transmission of said control message over said particular communication links to corresponding neighboring nodes and throughout said network.

41. The network of claim 37 further including a plurality of clusters each having said node as a head unit and a plurality of communication units being designated as member units, wherein head units of said clusters communicate with each other via said communication links to facilitate communications throughout said network.

42. In a communications network including a plurality of nodes each having a communication link between that node and each of its neighboring nodes, wherein each said communication link facilitates transfer of data and is selectively controllable to further facilitate transfer of control messages, a method of transmitting messages within said network comprising the steps of:
   (a) determining particular communication links for each node sufficient to transmit a control message from that node over said network to corresponding neighboring nodes within a predetermined hop limit based on network connectivity; and
   (b) selectively controlling said communication links of each node in accordance with said determination to enable said particular communication links to facilitate transmission of said control message from that node to each of its neighboring nodes to propagate said control message through said network by succeeding nodes receiving that message, wherein each communication link is controlled to facilitate transfer of data and said particular communication links are controlled to further facilitate transmission of said control message.

43. The method of claim 42 wherein each said node transmits said control message in the form of radio signals.

44. The method of claim 42 wherein each said node includes a storage unit to store information relating to network connectivity and said control message includes information relating to changes in network connectivity to synchronize storage units of said network nodes.

45. In a communications network including a plurality of nodes each having a communication link between that node and each fits neighboring nodes, wherein each said communication link includes a data link for transferring data and a control link for transferring control messages, a method of transmitting messages within said network comprising the steps of:
   (a) determining particular communication links for each node sufficient to establish communications via said network from that node to corresponding neighboring nodes within a predetermined hop limit based on network connectivity; and
   (b) selectively controlling said communication links of each node in accordance with said determination to enable said particular communication links to facilitate transmission of a control message from that node to each of its neighboring nodes to propagate said control message through said network by succeeding nodes receiving that message, wherein step (b) further includes:
      (b.1) enabling said data link of each said communication link; and
      (b.2) controlling said control links of said communication links of each node to facilitate transmission of said control message over said particular communication links of that node to corresponding neighboring nodes and throughout said network.

46. The method of claim 42 wherein said network further includes a plurality of clusters each having said node as a head unit and a plurality of communication units being designated as member units, wherein head units of said clusters communicate with each other via said communication links to facilitate communications throughout said network.

* * * * *